United States Patent
Bhandarkar (10) Patent No.: US 12,526,333 B2
(45) Date of Patent: Jan. 13, 2026

(54) METHOD AND SYSTEM FOR ACCESSING REMOTE FILES

(71) Applicant: Konica Minolta Business Solutions U.S.A., Inc., Ramsey, NJ (US)

(72) Inventor: Pranay Bhandarkar, Union City, CA (US)

(73) Assignee: Konica Minolta Business Solutions U.S.A., Inc., Ramsey, NJ (US)

( * ) Notice: Subject to any disclaimer, the term of this patent is extended or adjusted under 35 U.S.C. 154(b) by 173 days.

(21) Appl. No.: 18/621,951

(22) Filed: Mar. 29, 2024

(65) Prior Publication Data

US 2025/0310397 A1    Oct. 2, 2025

(51) Int. Cl.
| | |
|---|---|
| *H04L 67/06* | (2022.01) |
| *H04L 9/40* | (2022.01) |
| *H04L 67/08* | (2022.01) |
| *H04N 1/00* | (2006.01) |

(52) U.S. Cl.
CPC .......... *H04L 67/06* (2013.01); *H04L 63/0853* (2013.01); *H04L 63/0861* (2013.01); *H04L 67/08* (2013.01); *H04N 1/00244* (2013.01)

(58) Field of Classification Search
CPC . H04L 67/06; H04L 63/0853; H04L 63/0861; H04L 67/08; H04N 1/00244
See application file for complete search history.

(56) References Cited

U.S. PATENT DOCUMENTS

| | | | | |
|---|---|---|---|---|
| 2012/0287446 | A1* | 11/2012 | Matsumura | G06F 3/1285 358/1.6 |
| 2015/0046976 | A1* | 2/2015 | Tonegawa | H04L 63/08 726/3 |
| 2017/0310829 | A1* | 10/2017 | Kimura | G06F 3/1238 |
| 2017/0344325 | A1* | 11/2017 | Osadchyy | H04N 1/00973 |
| 2018/0084140 | A1* | 3/2018 | Yagiura | H04N 1/32112 |
| 2023/0367856 | A1* | 11/2023 | Polk | G10L 15/005 |

* cited by examiner

*Primary Examiner* — Benjamin M Thieu
(74) *Attorney, Agent, or Firm* — Buchanan Ingersoll & Rooney PC (57) ABSTRACT

A method for accessing a remote multifunction printer, the method includes receiving, by a first multifunction printer, an authenticator from a user; forwarding, by the first multifunction printer, the authenticator received to a remote server with a request to authenticate the user on the first multifunction printer and one or more second multifunction printers, the remote server configured to be in communication with the first multifunction printer and the one or more second multifunction printers; forwarding, by the first multifunction printer, a request for one or more files on the one or more second multifunction printers via a file transfer protocol, and wherein the user has been authenticated on the first multifunction printer and the one or more second multifunction printers by the remote server via a remote desktop protocol; and receiving, by the first multifunction printer, the one or more files from the one or more second multifunction printers.

20 Claims, 4 Drawing Sheets

METHOD AND SYSTEM FOR ACCESSING REMOTE FILES

FIELD OF THE DISCLOSURE

The present disclosure generally relates to a method and system for accessing remote files, and more particularly a method and system for accessing remote files from a first multifunction printer, and wherein the remote files are hosted on one or more second multifunction printers.

BACKGROUND

Functions of a multifunction printer (MFP) can include making copies, scanning, faxing, duplex printing, color printing, etc. Access to files locally stored on multifunction printers are not typically available to another multifunction printer.

SUMMARY

In accordance with an embodiment, a system and method are disclosed that can provide a multifunction printer access to files stored locally on another multifunction printer when the multifunction printers are connected to a same server, and the files are stored on the another multifunction printer. The files can be stored on the another multifunction printer on, for example, a local hard drive (HD), a flash drive having a universal serial bus (USB) port, or a physical storage device. For example, the files stored on the another multifunction printer may be relatively large that it would not be desirable to upload the relatively large file to a cloud server, and then retrieve the relatively large file from the cloud server. In addition, added security can be implemented, for example, by limiting access to the files stored on the multifunction printer and/or a flash drive connected to the multifunction printer.

A method is disclosed for accessing a remote multifunction printer, the method comprising: receiving, by a first multifunction printer, an authenticator from a user; forwarding, by the first multifunction printer, the authenticator received from the user to a remote server with a request to authenticate the user on the first multifunction printer and one or more second multifunction printers, the remote server configured to be in communication with the first multifunction printer and the one or more second multifunction printers; forwarding, by the first multifunction printer, a request for one or more files on the one or more second multifunction printers via a file transfer protocol, and wherein the user has been authenticated on the first multifunction printer and the one or more second multifunction printers by the remote server via a remote desktop protocol; and receiving, by the first multifunction printer, the one or more files from the one or more second multifunction printers via the file transfer protocol A non-transitory computer-readable medium having program instructions embodied therewith, the program instructions executable by a processor on a first multifunction printer to cause the processor of the first multifunction printers to perform a process comprising: receiving an authenticator from a user; forwarding the authenticator received from the user to a remote server with a request to authenticate the user on the first multifunction printer and one or more second multifunction printers, the remote server configured to be in communication with the first multifunction printer and the one or more second multifunction printers; forwarding a request for one or more files on the one or more second multifunction printers via a file transfer protocol, and wherein the user has been authenticated on the first multifunction printer and the one or more second multifunction printers by the remote server via a remote desktop protocol; and receiving the one or more files from the one or more second multifunction printers via the file transfer protocol.

A multifunction printer comprising: a processor configured to: receive an authenticator from a user; forward the authenticator received from the user to a remote server with a request to authenticate the user on the first multifunction printer and one or more second multifunction printers, the remote server configured to be in communication with the first multifunction printer and the one or more second multifunction printers; forward a request for one or more files on the one or more second multifunction printers via a file transfer protocol, and wherein the user has been authenticated on the first multifunction printer and the one or more second multifunction printers by the remote server via a remote desktop protocol; and receive the one or more files from the one or more second multifunction printers via the file transfer protocol.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

Multifunction peripherals or multifunction printers (MFP) often require users to login so that the managed print services can be implemented. The managed print services can include, for example, user authentication that control identities of users, which can help ensure that users have been authenticated at the MFP before a print job is released and/or printed. In addition, managed print services allow administrators to track and monitor usage in real time through regular, scheduled and on-demand reporting, management and charge back of costs by assigning users to cost centers, entering of billing or project codes before printing a document. Managed print services can also create print rules or policies, which can help ensure, for example, cost management by allowing different user roles to access different devices and features. For example, duplex printing and/or color printing may be allowed by certain individuals and/or groups and not permitted to other individuals and/or groups.

Figure 1:
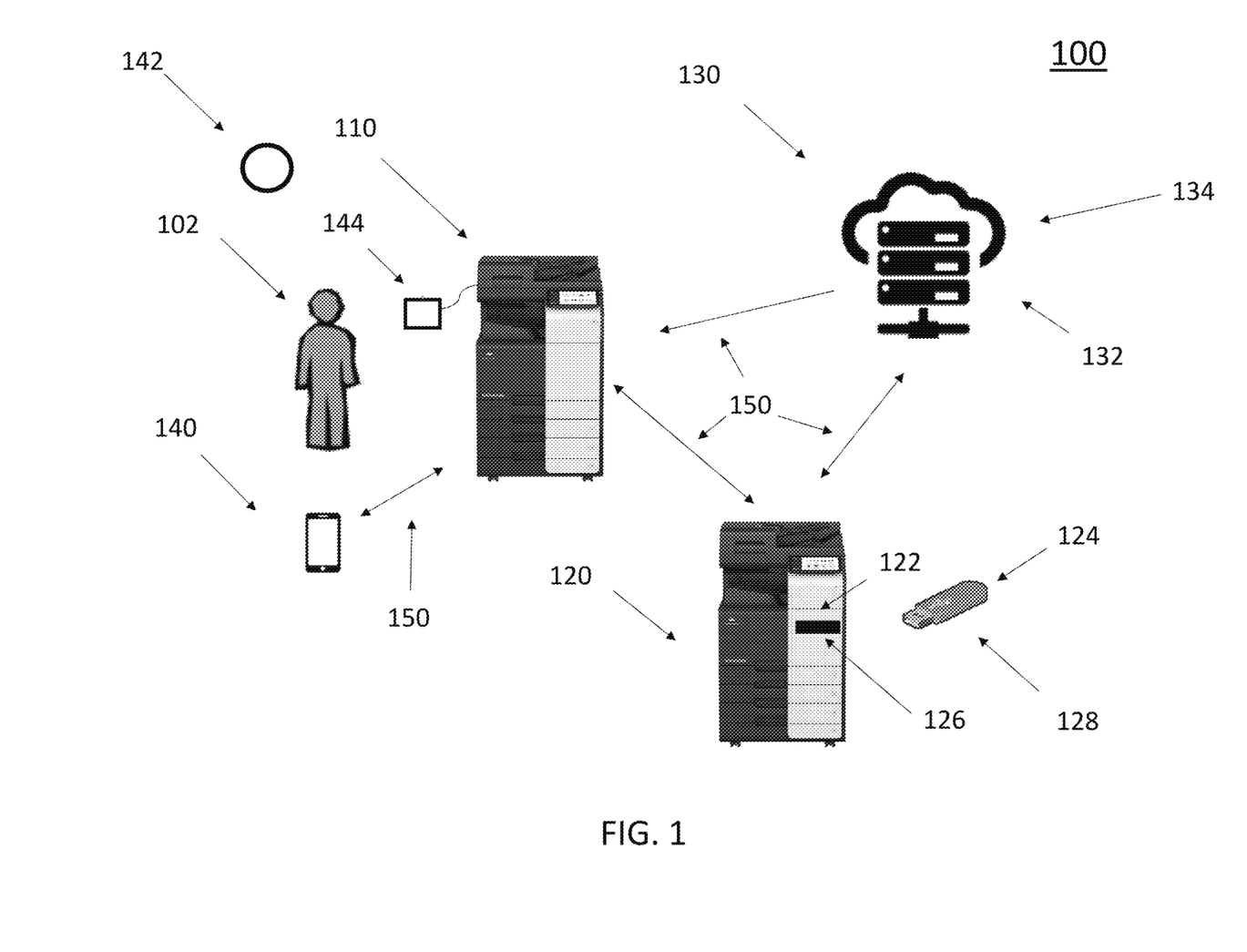
FIG. 1 is an illustration of a system for accessing remote files from a first multifunction printer, and wherein the remote files are being hosted on one or more second multifunction printers in accordance with an exemplary embodiment.

FIG. 1 is an illustration of a system 100 for accessing remote files 122, 124 from a first multifunction printer 110 that are being hosted on one or more second multifunction printers 120 in accordance with an exemplary embodiment. As shown in FIG. 1, the system 100 can include the first multifunction printer (MFP) 110, the one or more second multifunction printers (MFP) 120, and a remote server 130. In accordance with an embodiment, the remote server 130 can act as a remote desktop session host server as disclosed herein. In accordance with an embodiment, the system 100 is configured so that a user 102 that has been authenticated on the first multifunction printer 110 can access remote files 122, 124 locally stored on the one or more second multifunction printers (MFP) 120 from the first multifunction printer (MFP) 110, and wherein the first multifunction printer (MFP) 110 and the one or more second multifunction printers 120 are connected to the same remote server 130, for example, a remote server 132 in a cloud computing system 134.

The system 100 can also include one or more users 102 that can be authenticated on the first multifunction printer 110, for example, by entry of personal identification number or use of public key infrastructure (PKI) card on the first multifunction printer 110, or via an authentication process using, for example, a client device 140, a biometric identifier 142, or other authenticator or biometric of the user 102. For example, the user 102 may be authenticated on the first multifunction printer 110 via, for example, a fingerprint reader 144 associated with the first multifunction printer 110. In accordance with an embodiment, the client device 140 can be, for example, a mobile client, for example, a smart phone, a smart tablet, a smart watch, or a biometric band or the like. The authentication of the user 102 on the computer system 110 can be, for example, an authentication workflow for access to the first multifunction printer 110 and the one or more second multifunction printers 120. The remote server 132 can be a cloud computing system 134 that can include one or more servers running in a cloud computing environment that can be accessed on demand by the first multifunction printer 110 and the one or more second multifunction printers 120.

The first multifunction printer 110, the one or more second multifunction printers 120, the remote server 130, and the client device 140 can include a processor or central processing unit (CPU), and one or more memories for storing software programs and data. The processor or CPU carries out the instructions of a computer program, which operates and/or controls at least a portion of the functionality of the first multifunction printer 110, the one or more second multifunction printers 120, the remote server 130, and the client device 140. The first multifunction printer 110, the one or more second multifunction printers 120, the remote server 130, and the client device 140 can also include an operating system (OS), which manages the computer hardware and provides common services for efficient execution of various software programs. For example, the software programs can include application software, for example, for managing an authentication module and/or biometric identifier, and/or printer driver software, for example, for the first multifunction printer 110, the one or more second multifunction printers 120, the remote server 130, and the client device 140.

In accordance with an embodiment, the first multifunction printer 110 and the one or more second multifunction printers 120 can include at least a copy function, an image reading function, a facsimile (fax) function, and a printer function, and forms an image on a sheet based on a print job multifunction peripheral (print instruction) received, for example, from the first multifunction printer 110 for a resource or file hosted on the remote files 122, 124 of the one or more second multifunction printers 120. The first multifunction printer 110 and the one or more second multifunction printers 120 can include a memory, which stores an identify of one or more users 102 that can be authenticated, for example, via a personal identification number (PIN), a PKI card, or an authentication process using, for example, biometric identifiers of the user 102.

In accordance with an embodiment, the remote files 122, 124, can be hosted on one or more of a hard drive 126 and a flash drive 128. In accordance with an embodiment, the hard drive 126 can be a hard disk drive (HDD), a hard disk, a hard drive, or a fixed that includes one or more types of electro-mechanical data storage devices configured to store and retrieve digital data using magnetic storage with, for example, one or more rigid rapidly rotating platters coated with magnetic material. The flash drive 128 can be a portable computer drive that use flash memory, for example, a flash memory-based CompactFlash (CF) card, a Memory Stick (MS), a Multimedia Card (MMC), a Secure Digital card (SD), a SmartMedia card (SM), XD-Picture Card (xD), a Solid-state drive (SSD) using flash memory, or a USB flash drive (UFC). In accordance with an embodiment, the flash drive 128 can be connected to the one or more second multifunction printers 120 via a universal serial bus (USB) port, and can function as a folder or file folder.

In accordance with an embodiment, the first multifunction printer 110 and the one or more second multifunction printers 120 can be configured to host, for example, managed print services (MPS). The managed print services can include, for example, one or more of user authentication, monitoring and reporting, user and cost management, cost accounting and budget management, printer queue management, and workflow management. For example, user authentication can include control over identities of user, which can help ensure that users have been authenticated at a device before a print job is released and/or printed. The monitoring and report features can allow administrators to track and monitor usage in real time through regular, scheduled and on-demand reporting. The user and cost management feature can help manage and charge back costs by assigning users to cost centers, or enabling them to select the relevant cost center, billing or project code before printing a document. In addition, the user and cost management feature can be used to create print rules or policies, which can help ensure tighter cost management by allowing different user roles to access different devices and features. For example, the user and cost management feature can control, for example, duplex printing and/or color printing to individuals and/or groups. In addition, cost accounting and budget management provides for cost control and flexibility, which can be used as a print management solution that allows administrators to assign print budgets to users, with the option to top up their accounts. For example, in an environment such as a university, for example, this allows administrators to give students a free print quota that they can add to as required. In addition, a print queue management can be used for management of individual production in addition to office print queues in an office, for example.

The first multifunction printer 110, the one or more second multifunction printers 120, the remote server 130, and the client device 140 can be connected via a communication network 150. The communication network 150 may include, for example, a conventional type of network, wired or wireless, and may have any number of configurations, such as a star configuration, token ring configuration, or other known configurations. The communication network 150 may include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, 5G, other generations), and/or any other interconnected data path across which multiple computing nodes may communicate.

Data associated with the remote files 122, 124 that is stored on the hard drive 126 or the flash drive 128 of the one or more second multifunction printers 120 may be transmitted in encrypted or unencrypted form between the first multifunction printer 110, the one or more second multifunction printers 120, and the remote server 130, using a variety of different communication protocols including, for example, various Internet layer, transport layer, or application layer protocols. For example, the data may be transmitted between the first multifunction printer 110, the one or more second multifunction printers 120, and the remote server 130 via the network 150 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

In accordance with an exemplary embodiment, the user 102 can present an authenticator to the first multifunction printer 110 and/or the client device 140 for access to the first multifunction printer 110, the one or more second multifunction printers 120, and the remote server 130. For example, the authentication of the user 102 on the first multifunction printer 110 can be based on the biometrics of the user via a fingerprint scanner, an IC card or smart card, or other authenticator. In accordance with an exemplary embodiment, the authenticator can be via, for example, a security identification and authentication device (or authenticator), which uses automated methods of verifying or recognizing the identity of a living person based on a physiological or behavioral characteristic. Thus, the user 102 may not be required to manually input passwords to the one or more multifunction printers 110. The method of recognizing the user 102 can include, for example, fingerprints, electrocardiogram (ECG or EKG) information, facial images, iris, and voice recognition. For example, in accordance with an exemplary embodiment, a wearable device 142, for example, a Nymi™ band, which detection of the user 102 is based on the electrocardiogram (ECG) and its unique properties, e.g., electrical activity of the heartbeat of the user (e.g., wearer) 102 can be used as an authenticator. Authentication via the client device 140 can also include the presentation, for example, of mobile device, smart phone, or smart watch of the user 102 to a vicinity of an authenticator (e.g., client device 140) via a near-field communication (NFC) network (e.g., Bluetooth®) and wherein the user 102 has previously been authenticated on the mobile device or smart phone by one or more of a user identifier (ID) and password and/or a biometric identifier, for example, facial recognition, fingerprint, of the like.

In accordance with an exemplary embodiment, the authentication of the user 102 on the client device 140 can be a biometric identifier, which is a distinctive, measurable characteristics used to label and describe or identify an individual, including a metric related to human characteristics. For example, the biometric identifier can include physiological characteristics of an individual including but not limited fingerprints, palm veins, face recognition, DNA (or deoxyribonucleic acid), palm print, hand geometry, iris recognition, retina, and/or odor/scent.

In accordance with an embodiment, the first multifunction printer 110 includes a remote client that can be configured to remotely access the one or more second multifunction printers 120, via, for example, an internal web server (IWS) that creates a user interface (UI) to access the one or more second multifunction printers 120 as disclosed herein. The first multifunction printer 110 is also configured to verify the identity of the user 102 via an authentication manager 210, 210', for example, an identity provider (IdP) 220, 220' (FIG. 2) before the user 102 is granted access to the first multifunction printer 110 and the one or more second multifunction printers 120. The authentication manager 210, 210', can be, for example, an identity provider 220, 220' that is configured to create, maintain, and manage identity information and provide authentication services to the first multifunction printer 110 and the one or more second multifunction printers 120 via an authentication scheme such as single sign-on (SSO). The first multifunction printer 110 can obtain files or file folders hosted on the one or more second multifunction printers 120 via, for example, a file transfer protocol (FTP) and the retrieved files or file folders 122, 124 can be printed, etc.

Figure 2:
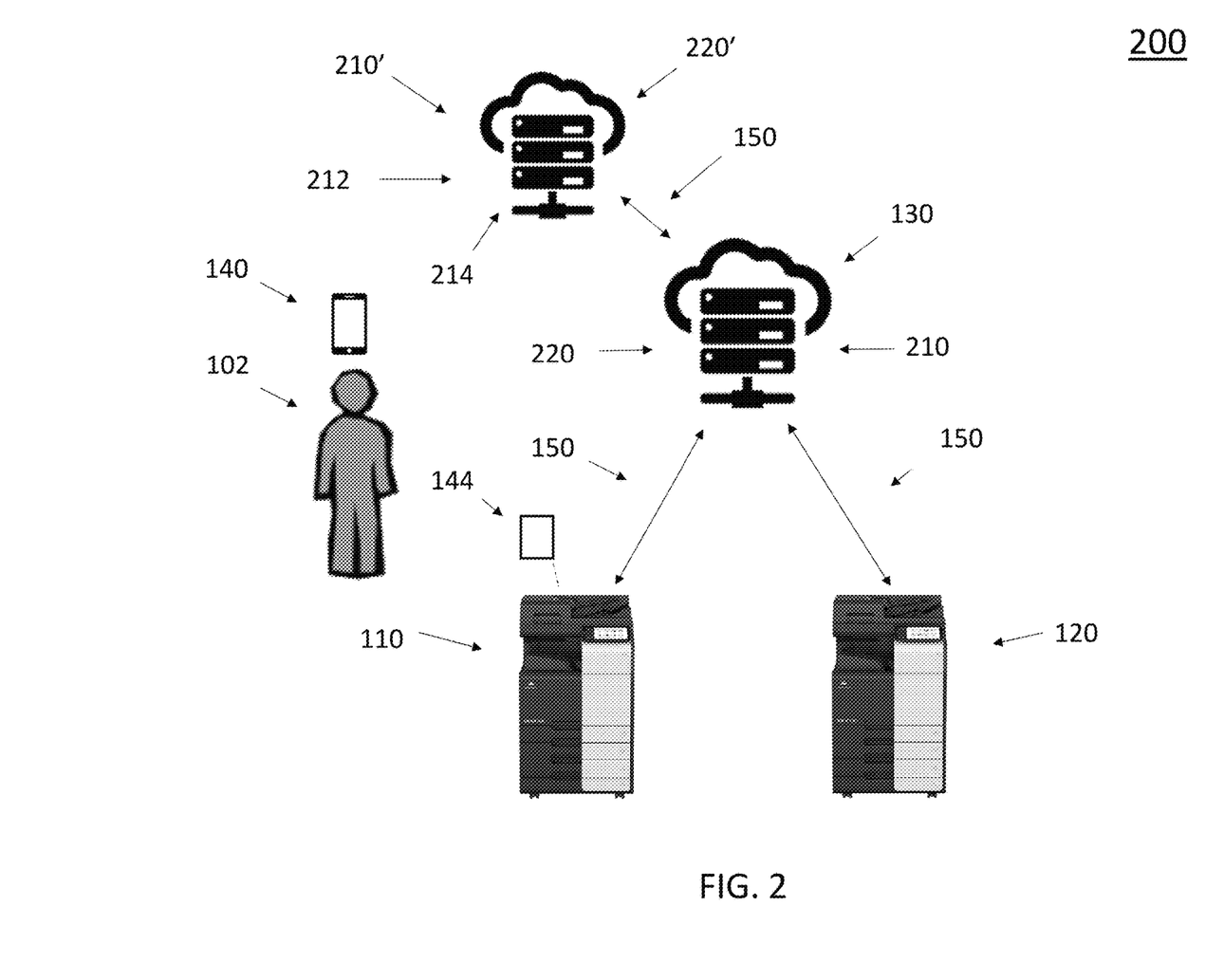
FIG. 2 is an illustration of a system for authenticating a user on a first multifunction printer (MFP) and one or more second multifunction printers in accordance with an exemplary embodiment.

The one or more second multifunction printers 120 can include a remote server/client that is configured to be accessed by the first multifunction printer 110 via a remote desktop protocol or remote desktop service. The one or more second multifunction printers 120 also include an active File Transfer Protocol (FTP) port, for example, a Secure File Transfer Protocol (SFTP) port that can communicate with the first multifunction printer 110. The first multifunction printer 110 and the one or more second multifunction printers 120 can be connected, for example, via a local area network (LAN), and are connected to the same server, for example, remote server 130 so that the user 102 can be validated by the identity provider (IdP) 220, 220', and via, for example, a network layer authentication (NLA) protocol, a secure connection can be established between the user 102, the first multifunction printer 110 and the one or more second multifunction printers 120 so that files, file systems, and file folders 122, 124 hosted on the one or more second multifunction printers 120 can be accessed by the user 102 and the first multifunction printer 110.

FIG. 2 is an illustration of a system 200 for authenticating a user 102 on the first multifunction printer 110 and one or more second multifunction printers 120 using a single sign-on (SSO) authentication process. As shown in FIG. 2, the system 200 can include the first multifunction printer 110, the one or more second multifunction printers 120, the remote server 130, and an optional cloud computing environment 212. In accordance with an embodiment, the authentication manager 210, for example, in the form of an identity provider 220 can be hosted with the remote server 130, or alternatively, authentication manager 210' can be an identity provider 220' within the cloud computing environment 210 that include or more servers 214.

As shown in FIG. 2, the remote server 130 can include the authentication manager 210 in the form, for example, of an identity provider (IdP) 220 configured to store and manage digital identities of one or more users 102. The identity provider (IdP) 220 can check the user's 102 identity via the received authenticator, for example, via username-password combinations and other factors including biometric factors. In addition, the identity provider (IdP) 220 can authenticate the first multifunction printer 110 and the one or more second multifunction printers 120 so that the user 102 can access and retrieve remote files 122, 124, for example, stored on a hard drive or a flash drive connected to the one or more second multifunction printers 120.

In accordance with an embodiment, the identity provider(s) (IdP) 220, 220' can include a list of the one or more second multifunction printers 120 that the user 102 and/or the first multifunction printer 110 can access. For example, the system 200 may include one or more of the one or more second multifunction printers 120 that the user 102 and/or the first multifunction printer 110 may not be able to access.

in accordance with an embodiment, the user 102 can access the first multifunction printer 110 via a biometric on a fingerprint scanner, an IC card or, alternatively, via a mobile application that authenticates the user 102 on the mobile device 140 via an authentication protocol. The user 102 can be authenticated, for example, using a single sign-on (SSO) authentication scheme or protocol. For example, the single sign-on (SSO) authentication scheme or protocol can authenticate the user 102 or digital identity of the user 102 via the remote server 130.

As shown in FIG. 2, the first multifunction printer 110 receives the request and will forward the authentication request to the remote server 130 that can include the identity provider (IdP) 220. The identity provider (IdP) 220 is configured to store and manage the digital identities of one or more users 102. The identity provider (IdP) 220 checks the identity of the user 102 via the authenticator, for example, via username-password combinations and other factors including biometric factors. In addition, the identity provider (IdP) 220 can also authenticate any entity connected to a network or a system, for example, the first multifunction printer 110, the one or more second multifunction printers 120, and the client device 140.

In accordance with an embodiment, the authentication of the user 102 by the identity provider (IdP or IDP) 220, 220', can be a single sign-on (SSO) authentication scheme, which creates, maintains, and manages identity information for users 102 and provides authentication services to the first multifunction printer 110 and the one or more second multifunction printers 120 that are connected, for example, by a local area network (LAN) as disclosed herein in combination with a remote desktop protocol or remote desktop service. In accordance with an embodiment, the remote desktop protocol or remote desktop service can include and/or be based on, for example, Remote Desktop Protocol (RDP), Independent Computing Architecture (ICS), and virtual network computing (VNC).

The authenticator, can be, for example, one or more of a password or passcode and biometric identifiers. In accordance with an exemplary embodiment, biometric identifiers can include distinctive, measurable characteristics used to label and describe or identify an individual, including a metric related to human characteristics. For example, biometric identifiers 230 can include physiological characteristics of an individual including but not limited fingerprints, palm veins, face recognition, DNA (or deoxyribonucleic acid), palm print, hand geometry, iris recognition, retina, and/or odor/scent.

The first multifunction printer 110 can be configured to receive the authenticator(s) and/or biometric identifier(s), for example, via a keypad for a username and password ("password"), and/or a sensor, scanning device, or an electronic reader, which can read and/or obtain data from, for example, a proximity cards, a radio-frequency identification (RFID) card, smart cards, wearable devices, RSA tokens, and/or biometric identifiers. The first multifunction printer 110 and the one or more second multifunction printers 120 can be accessed by the user 102 via at least one authenticator and/or a biometric identifier. In accordance with an embodiment, the authentication of the user 102 can require at least two or more authenticators and/or biometric identifiers, e.g., two-factor authentication (2FA).

As shown in FIG. 2, the user 102 can be authenticated, for example, using the single sign-on (SSO) authentication scheme by entering an authenticator, for example, the biometric identifier from a reader (for example, a fingerprint reader) 144 associated with the first multifunction printer 110. In accordance with an embodiment, the authenticator received on the first multifunction printer 110 can be sent via a secure protocol to the remote server 130 for verification by the authentication manager 210, for example, by the identity provider 220. Alternatively, the remote server 130 can forward the authenticator to an identity provider 220' hosted in the cloud computing environment 212.

In accordance with an embodiment, the first multifunction printer 110 can initiate, for example, a request for remote connection with the one or more second multifunction printers 120 to the remote server 130 in a negotiation process. During this negotiation, the remote server 130 can present a digital identity (certificate) to the first multifunction printer 110. The first multifunction printer 110 can verify the authenticity of the remote server 130 using this certificate. If the remote server 130 is trusted, the first multifunction printer 110 generates a challenge, encrypts the challenge using a public key of the remote server 130, and sends the public key to the remote server 130. Upon receiving the encrypted challenge, the remote server 130 decrypts the encrypted challenger using a private key of the remote server 130. If the remote server 130 successfully decrypts the challenge, it proves that it possesses the corresponding private key and is, therefore, a legitimate entity.

The remote server 130 can acknowledge the first multifunction printer 110 as trustworthy and prompts the first multifunction printer 110 to provide credentials of the user 102 via, for example, a biometric authenticator, a smart card, or a username and password. The first multifunction printer 110 securely sends the credentials of the user to the remote server 130, encrypted using a session key that was established during the negotiation process. The remote server 130 decrypts the credentials of the user 102 using the session key and verifies the credentials of the user 102 in the authentication manager 210 or identity provider server 220, 220'. If the credentials of the user 102 are valid, the remote server 130 allows the first multifunction printer 110 to access the one or more second multifunction printers 120.

As set forth above, the verification process verifies that the authenticator and authentication information, for example, biometrics of the user 102, \received from the user 102 is indeed authentic. Once, the user 102 has been authenticated by the identity provider 220, 220', in accordance with an embodiment, the remote server 130 can connect (i.e., establish a session between) the first multifunction printer 110 to the one or more second multifunction printers 120 via, for example, a Network Level Authentication (NLA) protocol. In accordance with an embodiment, the remote server 130, which is connected to the first multifunction printer 110 and the one or more second multifunction printers 120, can authenticate the user 102, for example, via the single sign-on (SSO) scheme, and can send the authentication credentials to the one or more second multifunction printers 120, and upon receiving the credentials of the user 102, the one or more second multifunction printers 120 can automatically log the user 102 and the first multifunction printer 110 into the one or more second multifunction printers 120. In accordance with an embodiment, a communication between the first multifunction printer 110 and the one or more second multifunction printers 120 can be established, for example, via a file transfer protocol (FTP). In accordance with an embodiment, the file transfer protocol between the first multifunction printer 110 and the one or more second multifunction printers 120 can be Secure File Transfer Protocol (SFTP).

Figure 3:
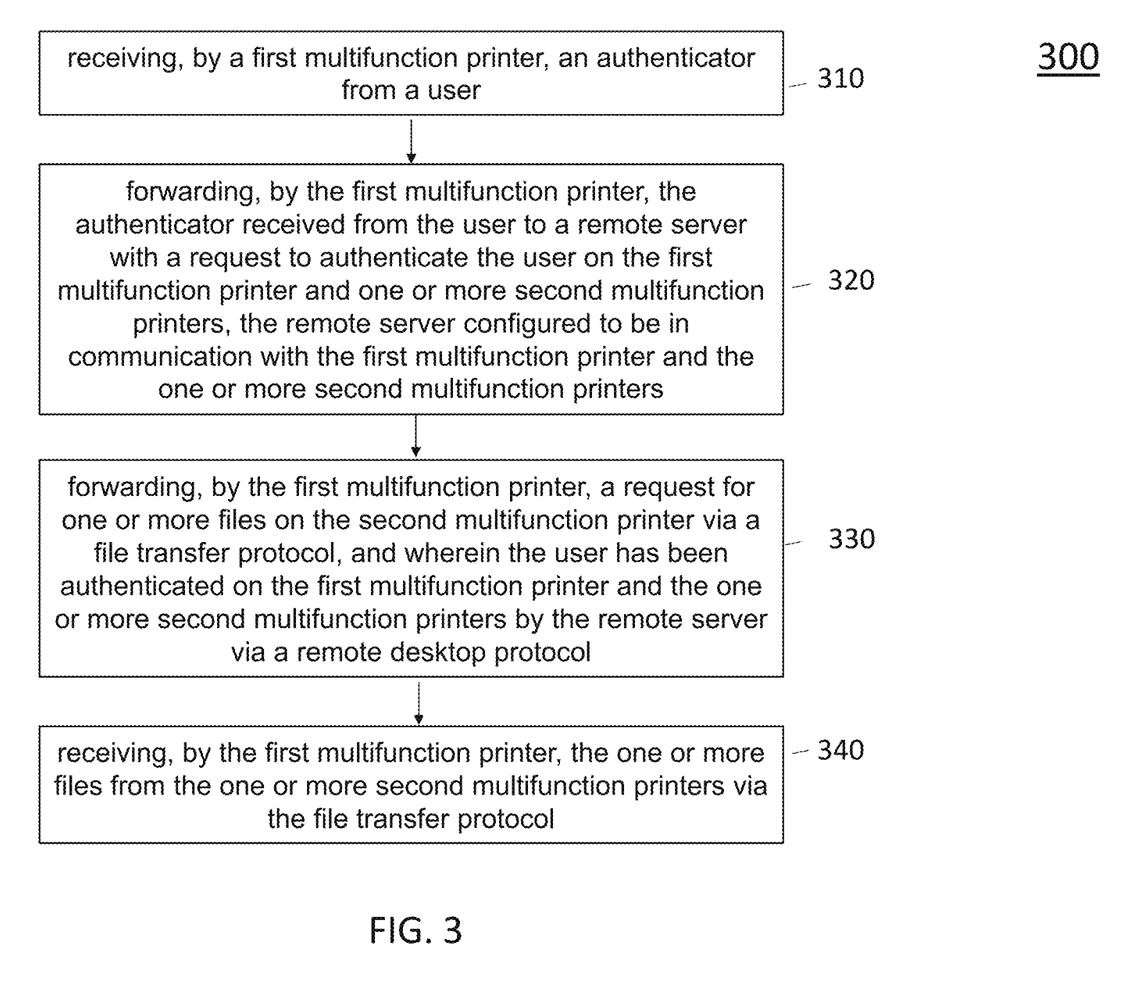
FIG. 3 is a flowchart illustrating a method for accessing remote files from a first multifunction printer, and wherein the remote files are being hosted on one or more second multifunction printers in accordance with an exemplary embodiment.

FIG. 3 is a flowchart illustrating a method 300 for accessing remote files 122, 124 from a first multifunction printer 110, and wherein the remote files 122, 124 are being hosted on one or more second multifunction printers 120 in accordance with an exemplary embodiment. As shown in FIG. 3, in step 310, an authenticator is received from a user 102 by the first multifunction printer 110. In step 320, the first multifunction printer 110 forwards the authenticator received from the user 102 to a remote server 130 with a request to authenticate the user 102 on the first multifunction printer 110 and one or more second multifunction printers 120, the remote server 130 configured to be in communication with the first multifunction printer 110 and the one or more second multifunction printers 120. In step 330, the first multifunction printer 110 forwards a request for one or more files 122, 124 on the one or more second multifunction printers 120 via a file transfer protocol, and wherein the user 102 has been authenticated on the first multifunction printer 110 and the one or more second multifunction printers 120 by the remote server 130 via a remote desktop protocol. In step 340, the first multifunction printer 110 receives the one or more files 122, 124 from the one or more second multifunction printers 120 via the file transfer protocol.

In accordance with another embodiment, the method 300 can further include: sending, by the first multifunction printer 110, the request to authenticate the user on the first multifunction printer 110 and the one or more second multifunction printers 120 via the remote desktop protocol, and communicating, by the first multifunction printer 110, with the one or more second multifunction printers 120 via the file transfer protocol.

In accordance with an embodiment, for example, the authenticator can be received from the user on the first multifunction printer 110 is a biometric authenticator or a smart card.

In accordance with another embodiment, the method can further include forwarding, by the remote server 130, the authenticator received from the user to the server to an identity provider for authentication of the user to access the one or more second multifunction printers 120, the identity provider being hosted on one or more of the remote server 130 or an identity provider server.

In accordance with an embodiment, the method can include creating, by the first multifunction printer 110, a user interface to access the one or more second multifunction printers 120 via the file transfer protocol with an internal web server. The method can also include communicating, by first multifunction printer 110, with one or more second multifunction printers 120 via the remote desktop protocol, and wherein the remote desktop protocol is selected from Remote Desktop Protocol (RDP), Independent Computing Architecture (ICA), and virtual network computing (VNC).

In accordance with another embodiment, the method can include communicating, by the first multifunction printer 110, with the one more second multifunction printers 120, via the file transfer protocol, and wherein the file transfer protocol is Secure File Transfer Protocol (SFTP).

In accordance with another embodiment, the method can include forwarding, to the first multifunction printer 110, the request for the one or more files 122, 124 on the one or more second multifunction printers 120, and wherein the one or more files 122, 124 on the one or more second multifunction printers 120 are stored on a local hard drive on the one or more second multifunction printers 120 or a flash drive connected to the one or more second multifunction printers 120 via a universal serial bus (USB) connection.

In accordance with an embodiment, the method can include receiving, by the first multifunction printer 110, an indication from the remote server 130 that the user has been authorized to access one or more files 122, 124 on the one or more second multifunction printers 120; and creating, by the multifunction printer, a user interface from an internal web server application hosted on the first multifunction printer 110 to access the one or more files 122, 124 being hosted on the one or more second multifunction printers 120.

In accordance with another embodiment, the authenticator can be a biometric authenticator, and the method further includes receiving, the biometric authenticator on a biometric authenticator device associated with the first multifunction printer 110, the biometric authenticator device including one or more of a sensor, a scanning device, or an electronic reader, and wherein the biometric identifier of the user being at least one physiological characteristic of the user, and wherein the at least one physiological characteristic is selected from one or more of fingerprints, palm veins, face recognition, DNA (deoxyribonucleic acid), palm print, hand geometry, iris recognition, retina, and/or odor/scent.

In accordance with an embodiment, the method further includes authenticating, by an identify provider, the user for access to the first multifunction printer 110 and the one or more second multifunction printer when the authenticator received from the first multifunction printer 110 corresponds to the authenticator associated with the user in the identity provider, and wherein the identity provider is hosted on the remote server 130.

In accordance with another embodiment, the method further includes printing, by the first multifunction printer 110, at least a portion of the one or more files 122, 124 received from the one or more second multifunction printers 120.

In accordance with an embodiment, the method further includes establishing a session between the first multifunction printer 110 and the one or more second multifunction printers 120 via a Network Level Authentication (NLA) protocol.

In accordance with another embodiment, the method includes receiving, by the first multifunction printer 110, the authenticator from the user via a client device via a wireless communication protocol, the wireless protocol being a near-field communication (NFC) or a Bluetooth technology standard, and wherein the client device is a mobile device, a smart phone, or a wearable device.

Figure 4:
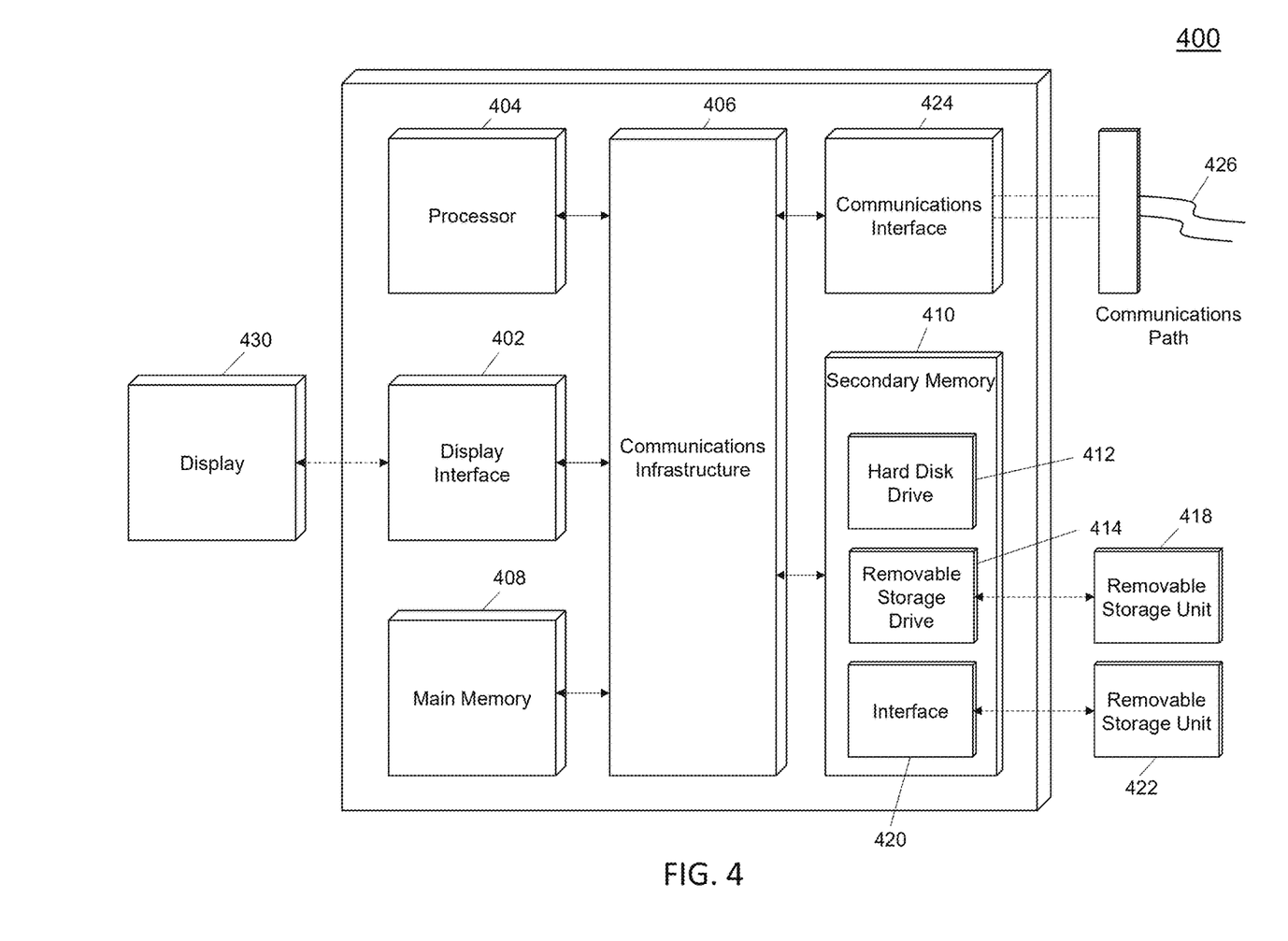
FIG. 4 is an illustration of an exemplary hardware architecture for an embodiment of a computer system.

FIG. 4 illustrates a representative computer system 400 in which embodiments of the present disclosure, or portions thereof, may be implemented as computer-readable code executed on hardware. For example, the first multifunction printer 110, the one or more second multifunction printers 120, the remote server 130, the client device 140, and the wearable device 142, and the cloud computing environment 212 associated with the method and system for accessing remote files 122, 124 from a first multifunction printer 110, and wherein the remote files 122, 124 are hosted on one or more second multifunction printers 120 as disclosed herein may be implemented in whole or in part by a computer system 400 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this representative computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 404 may be processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc. Computer program medium and computer usable medium may refer to memories, such as the main memory 408 and secondary memory 410, which may be memory semiconductors (e.g., DRAMs, etc.). These computer program products may be means for providing software to the computer system 400. Computer programs (e.g., computer control logic) may be stored in the main memory 408 and/or the secondary memory 410. Computer programs may also be received via the communications interface 424. Such computer programs, when executed, may enable computer system 400 to implement the present methods as discussed herein. In particular, the computer programs, when executed, may enable processor device 404 to implement the methods illustrated by FIGS. 1-3, as discussed herein. Accordingly, such computer programs may represent controllers of the computer system 400. Where the present disclosure is implemented using software executed on hardware, the software may be stored in a computer program product and loaded into the computer system 400 using the removable storage drive 414, interface 420, and hard disk drive 412, or communications interface 424.

The processor device 404 may comprise one or more modules or engines configured to perform the functions of the computer system 400. Each of the modules or engines may be implemented using hardware and, in some instances, may also utilize software executed on hardware, such as corresponding to program code and/or programs stored in the main memory 408 or secondary memory 410. In such instances, program code may be compiled by the processor device 404 (e.g., by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 400 to perform the functions disclosed herein. It will be apparent to persons having skill in the relevant art that such processes result in the computer system 400 being a specially configured computer system 400 uniquely programmed to perform the functions discussed above.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for accessing a remote multifunction printer, the method comprising:
   receiving, by a first multifunction printer, an authenticator from a user;
   forwarding, by the first multifunction printer, the authenticator received from the user to a remote server with a request to authenticate the user on the first multifunction printer and one or more second multifunction printers, the remote server configured to be in communication with the first multifunction printer and the one or more second multifunction printers;
   forwarding, by the first multifunction printer, a request for one or more files on the one or more second multifunction printers via a file transfer protocol, and wherein the user has been authenticated on the first multifunction printer and the one or more second multifunction printers by the remote server via a remote desktop protocol; and
   receiving, by the first multifunction printer, the one or more files from the one or more second multifunction printers via the file transfer protocol.

2. The method according to claim 1, further comprising:
   sending, by the first multifunction printer, the request to authenticate the user on the first multifunction printer and the one or more second multifunction printers via the remote desktop protocol; and
   communicating, by the first multifunction printer, with the one or more second multifunction printers via the file transfer protocol.

3. The method according to claim 1, wherein the authenticator received from the user on the first multifunction printer is a biometric authenticator or a smart card.

4. The method according to claim 1, further comprising:
   forwarding, by the remote server, the authenticator received from the user to the server to an identity provider for authentication of the user to access the one or more second multifunction printers, the identity provider being hosted on one or more of the remote server or an identity provider server.

5. The method according to claim 1, further comprising:
   creating, by the first multifunction printer, a user interface to access the one or more second multifunction printers via the file transfer protocol with an internal web server.

6. The method according to claim 1, further comprising:
   communicating, by first multifunction printer, with one or more second multifunction printers via the remote desktop protocol, and wherein the remote desktop protocol is selected from Remote Desktop Protocol (RDP), Independent Computing Architecture (ICA), and virtual network computing (VNC).

7. The method according to claim 1, further comprising: communicating, by the first multifunction printer, with the one more second multifunction printers, via the file transfer protocol, and wherein the file transfer protocol is Secure File Transfer Protocol (SFTP).

8. The method according to claim 1, further comprising: forwarding, to the first multifunction printer, the request for the one or more files on the one or more second multifunction printers, and wherein the one or more files on the one or more second multifunction printers are stored on a local hard drive on the one or more second multifunction printers or a flash drive connected to the one or more second multifunction printers via a universal serial bus (USB) connection.

9. The method according to claim 1, further comprising: receiving, by the first multifunction printer, an indication from the remote server that the user has been authorized to access one or more files on the one or more second multifunction printers; and
creating, by the multifunction printer, a user interface from an internal web server application hosted on the first multifunction printer to access the one or more files being hosted on the one or more second multifunction printers.

10. The method according to claim 1, wherein the authenticator is a biometric authenticator, the method further comprises:
receiving, the biometric authenticator on a biometric authenticator device associated with the first multifunction printer, the biometric authenticator device including one or more of a sensor, a scanning device, or an electronic reader, and wherein the biometric identifier of the user being at least one physiological characteristic of the user, and wherein the at least one physiological characteristic is selected from one or more of fingerprints, palm veins, face recognition, DNA (deoxyribonucleic acid), palm print, hand geometry, iris recognition, retina, and/or odor/scent.

11. The method according to claim 1, further comprising: authenticating, by an identify provider, the user for access to the first multifunction printer and the one or more second multifunction printer when the authenticator received from the first multifunction printer corresponds to the authenticator associated with the user in the identity provider, and wherein the identity provider is hosted on the remote server.

12. The method according to claim 1, further comprising: printing, by the first multifunction printer, at least a portion of the one or more files received from the one or more second multifunction printers.

13. The method according to claim 1, further comprising: establishing a session between the first multifunction printer and the one or more second multifunction printers via a Network Level Authentication (NLA) protocol.

14. The method according to claim 1, further comprising: receiving, by the first multifunction printer, the authenticator from the user via a client device via a wireless communication protocol, the wireless protocol being a near-field communication (NFC) or a Bluetooth technology standard, and wherein the client device is a mobile device, a smart phone, or a wearable device.

15. A non-transitory computer-readable medium having program instructions embodied therewith, the program instructions executable by a processor on a first multifunction printer to cause the processor of the first multifunction printers to perform a process comprising:
receiving an authenticator from a user;
forwarding the authenticator received from the user to a remote server with a request to authenticate the user on the first multifunction printer and one or more second multifunction printers, the remote server configured to be in communication with the first multifunction printer and the one or more second multifunction printers;
forwarding a request for one or more files on the one or more second multifunction printers via a file transfer protocol, and wherein the user has been authenticated on the first multifunction printer and the one or more second multifunction printers by the remote server via a remote desktop protocol; and
receiving the one or more files from the one or more second multifunction printers via the file transfer protocol.

16. The non-transitory computer-readable medium according to claim 15, further comprising:
sending the request to authenticate the user on the first multifunction printer and the one or more second multifunction printers via the remote desktop protocol; and
communicating with the one or more second multifunction printers via the file transfer protocol.

17. The non-transitory computer-readable medium according to claim 15, wherein the authenticator received from the user on the first multifunction printer is a biometric authenticator or a smart card.

18. The non-transitory computer-readable medium according to claim 15, further comprising:
forwarding the authenticator received from the user to the server to an identity provider for authentication of the user to access the one or more second multifunction printers, the identity provider being hosted on one or more of the remote server or an identity provider server.

19. The non-transitory computer-readable medium according to claim 15, further comprising:
creating a user interface to access the one or more second multifunction printers via the file transfer protocol with an internal web server.

20. A multifunction printer comprising:
a processor configured to:
receive an authenticator from a user;
forward the authenticator received from the user to a remote server with a request to authenticate the user on the first multifunction printer and one or more second multifunction printers, the remote server configured to be in communication with the first multifunction printer and the one or more second multifunction printers;
forward a request for one or more files on the one or more second multifunction printers via a file transfer protocol, and wherein the user has been authenticated on the first multifunction printer and the one or more second multifunction printers by the remote server via a remote desktop protocol; and
receive the one or more files from the one or more second multifunction printers via the file transfer protocol.

* * * * *